United States Patent
Sloat

(10) Patent No.: US 7,963,534 B2
(45) Date of Patent: Jun. 21, 2011

(54) LOCKING BARREL CADDIE

(76) Inventor: Craig Sloat, Redlands, CA (US)

( * ) Notice: Subject to any disclaimer, the term of this patent is extended or adjusted under 35 U.S.C. 154(b) by 257 days.

(21) Appl. No.: 11/580,429

(22) Filed: Oct. 13, 2006

(65) Prior Publication Data

US 2008/0088103 A1    Apr. 17, 2008

(51) Int. Cl.
*B62B 3/02*    (2006.01)
(52) U.S. Cl. .................. 280/79.5; 414/445
(58) Field of Classification Search ........... 280/79.11, 280/79.5, 47.12; 414/445; 188/5, 19
See application file for complete search history.

(56) References Cited

U.S. PATENT DOCUMENTS

| | | | | |
|---|---|---|---|---|
| 1,738,096 A | * | 12/1929 | Cole | 414/448 |
| 3,307,658 A | * | 3/1967 | Stevenson | 188/5 |
| 3,815,767 A | * | 6/1974 | Lund et al. | 414/456 |
| 4,249,612 A | * | 2/1981 | Lajack | 172/43 |
| 4,815,569 A | * | 3/1989 | Norman | 188/5 |
| 5,035,445 A | * | 7/1991 | Poulin | 280/763.1 |
| 5,143,389 A | * | 9/1992 | Jonkers | 280/47.26 |
| D340,563 S | | 10/1993 | Kean et al. | |
| 5,678,976 A | * | 10/1997 | Rodriguez | 414/448 |
| 5,752,543 A | | 5/1998 | Groening | |
| 6,053,516 A | * | 4/2000 | Ottaway | 280/79.5 |
| 6,315,310 B1 | * | 11/2001 | Hurt | 280/79.5 |
| 6,390,759 B1 | * | 5/2002 | Novak et al. | 414/430 |
| 6,454,281 B1 | * | 9/2002 | Pearson | 280/47.26 |
| 6,454,285 B1 | * | 9/2002 | Koenig | 280/250.1 |
| 6,488,293 B1 | | 12/2002 | Mitchell et al. | |
| 6,682,084 B2 | * | 1/2004 | Webster et al. | 280/79.5 |
| 7,384,050 B2 | * | 6/2008 | Blum et al. | 280/47.26 |
| 2008/0088103 A1 | * | 4/2008 | Sloat | 280/79.5 |

* cited by examiner

*Primary Examiner* — Jeffrey J Restifo
(74) *Attorney, Agent, or Firm* — Kirk A. Buhler; Buhler & Associates

(57) ABSTRACT

A 4 wheeled cart for transporting and storing a barrel including a handle permanently attached to the side of the cart. Raising the handle simultaneously raises the wheels off the ground to prevent cart movement. The barrel can be restrained to the cart by locking the handle which extends up and over the cart. The cart can also tilt the barrel off center axis to provide more efficient extraction of liquids with a suction device.

5 Claims, 6 Drawing Sheets

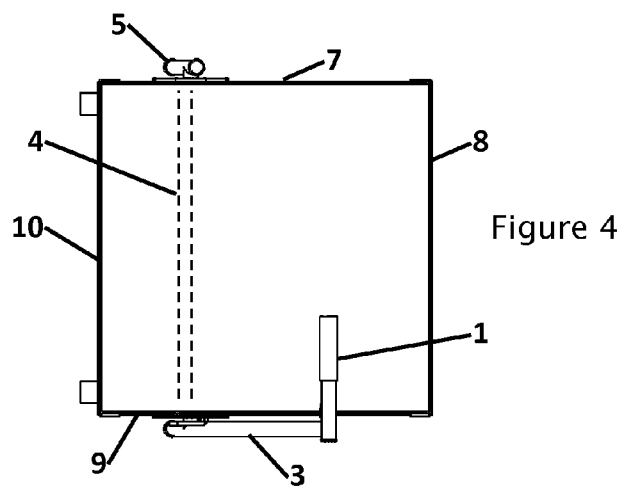
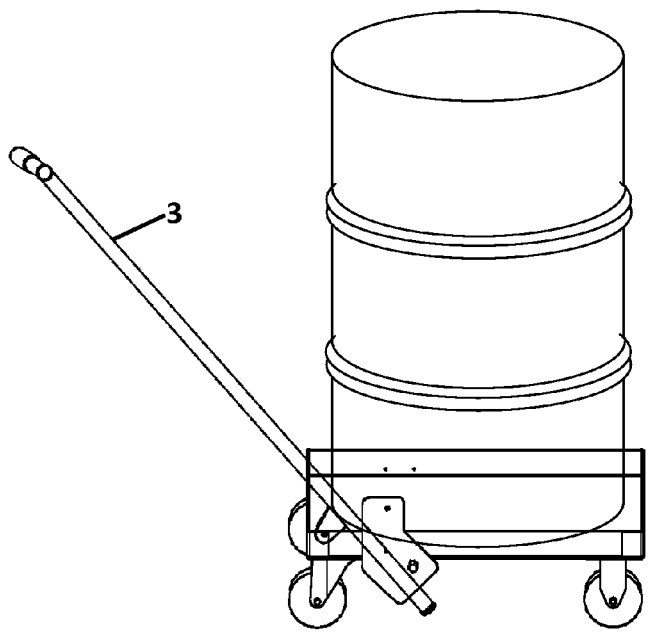
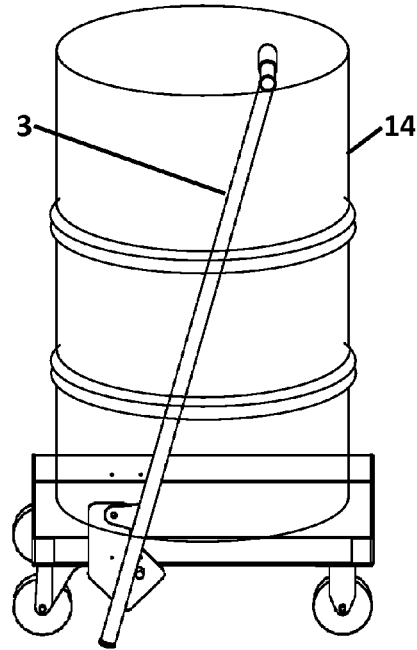
Figure 4
Figure 5
Figure 6

LOCKING BARREL CADDIE

FIELD OF THE INVENTION

This invention relates to barrel carts, more specifically the invention is a caddie where a drum, such as a 55 gallon drum, is placed and moved. The barrel caddie allows for braking, locking, and tipping the barrel while carried on cart.

BACKGROUND OF THE INVENTION

Business and industry commonly use barrels to store a variety of liquids and other trinkets. A standard 55 gallon barrel can be extremely heavy and difficult to move. Stopped Inventors have created carts and pulleys of different sorts to make movement of a barrel more manageable. U.S. Pat. No. D340,563 issued Oct. 19, 1993 to Kean et al. offers a simple platform supported by 4 casters suitable for carrying a barrel. Kean's rolling platform makes the chore of moving a barrel much easier. The simple design was later improved upon by U.S. Pat. No. 6,488,293 issued Dec. 3, 2002 to Mitchell et al. Mitchell added a handle to the cart that made maneuvering the barrel easer. The base was circular in form and even provided a means of capturing small amounts of liquid that might spill or leak from the barrel. Still another U.S. Pat. No. 5,752,543 issued May 19, 1998 to Groening went as far as being able to contain a spill if all of a full barrel's contents should a leak occur.

Although there are several available types of barrel movers that are available today, they tend to provide inadequate utility in 3 areas of use.

First, because of the weight of a full barrel, the barrel is rarely unloading off the cart and the barrel tends to stay on the cart until its contents are consumed. Placing a loaded cart on a slightly inclining surface such as a driveway will cause the cart to roll away. A freely rolling cart and barrel creates a potential hazard because in an industrial setting with fast paced activity a barrel on a freely rolling cart could accidentally be bumped onto the path of forklifts and other machinery.

Second, the contents of a barrel are often expensive. A barrel placed on a cart can easily be rolled away by a thief. Even shrinkage of the barrel's contents can be expensive and frustrating.

Third, draining the barrel with a pump often leaves some undesired liquid at the bottom. Shims are often used to prop up one side of the barrel to allow for more complete evacuation.

BRIEF SUMMARY OF THE INVENTION

It is an object of the barrel caddie to provide a cart to move and store a barrel. The barrel mover includes a plurality of wheels located on the bottom of the mover to roll the barrel as required.

It is another object of the barrel caddie to provide a barrel caddie where the rolling movement may be arrested through the use of a brake mechanism. The brake exists at the end of the handle and when the handle is rotated the lower extended portion of the handle grabs into the ground to prevent further movement of the barrel. The braking force is somewhat proportional to the amount of fluid that is inside of the barrel.

It is another object of the barrel caddie to provide a barrel cart with a handle that may be locked in a position directly above the barrel preventing removal of the barrel from the cart. While the handle is locked over the barrel a cap may be sandwiched between the handle and the top of the barrel to prevent shrinkage.

It is another object of the barrel caddie to provide steering of the barrel from a position located between the wheels. Locating the control and steering mechanism between the wheels allows for better control of a full barrel and reduces the mechanical leverage that can lift and tip over a barrel when the handle is mounted to the end of the cart.

It is yet another object of the barrel caddie to provide a cart that can tilt the barrel to allow for more complete evacuation of the barrel with a pump. The tipping is accomplished by rotating the handle to lift one corner of the caddie so the fluid flows to the lowest part of the barrel.

Various objects, features, aspects, and advantages of the present barrel caddie will become more apparent from the following detailed description of preferred embodiments of the barrel caddie, along with the accompanying drawings in which like numerals represent like components.

BRIEF DESCRIPTION OF THE DRAWINGS

FIG. 4 is a top view of the base and handle assembly.

FIG. 5 is an isometric view of the base, handle assembly, and barrel. The handle assembly is in the down position.

FIG. 6 is an isometric view of the base, handle assembly, and barrel. The handle assembly is in the up position.

DETAILED DESCRIPTION

Figure 1A:
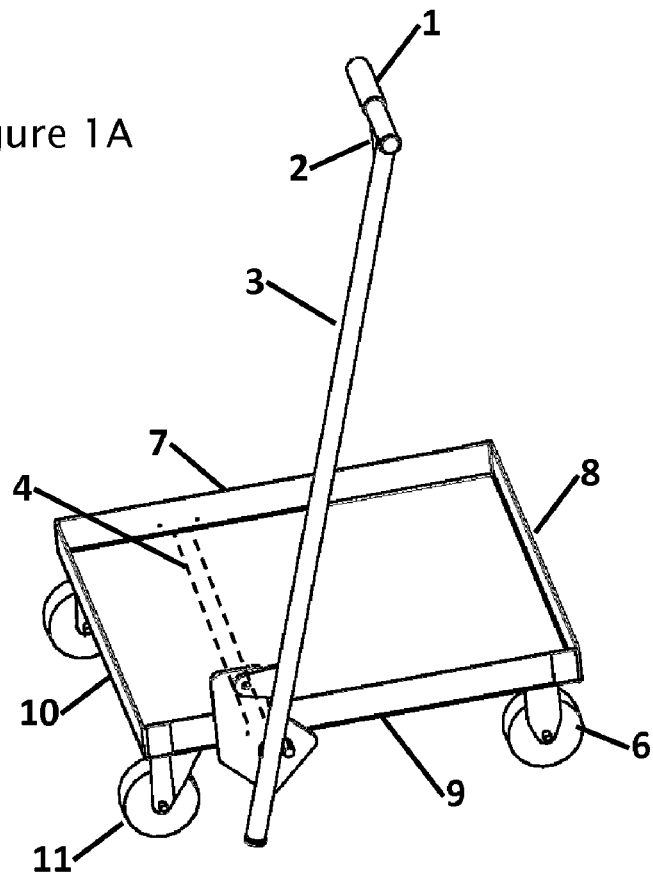
FIG. 1A is an isometric view of the barrel caddie including the casters, base, and elongated handle.
Figure 1B:
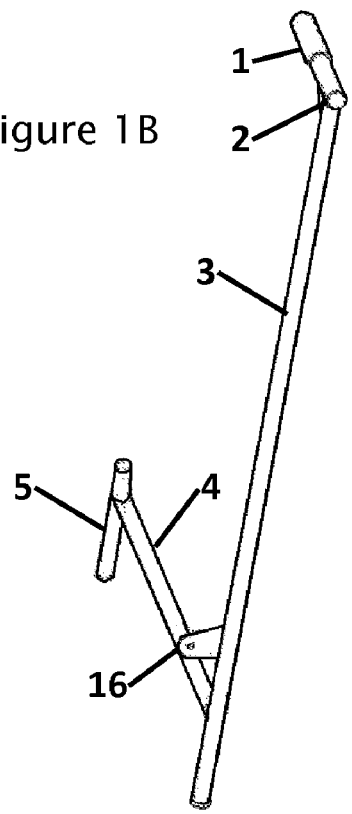
FIG. 1B is an isometric view of the handle assembly without the base or casters.
Figure 1C:
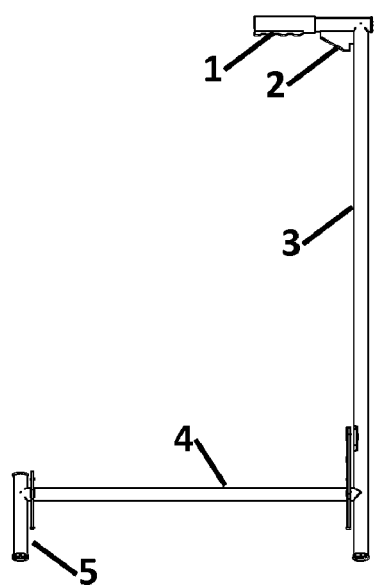
FIG. 1C is a left side view of the handle assembly.

FIGS. 1A-B shows various views of the barrel caddie and the handle. FIG. 1A is an isometric view of the barrel caddie including the casters, base, and elongated handle while FIG. 1B is an isometric view of the handle assembly without the base or casters and FIG. 1C is a left side view of the handle assembly. Referring to FIG. 1A a base or platform 7, 8, 9, 10 is constructed using steel or angle iron.

In the preferred embodiment each piece of angle iron has a length of 25 inches and is between $\frac{1}{16}^{th}$ inch and $\frac{3}{16}^{th}$ inch thick. Each end of the angle iron is cut at a 45 degree angle so that they form a 90 degree angle when joined. The four pieces of the base are welded together at right angles to form a square.

Each corner of the base 7, 8, 9, and 10 is supported by a wheel or caster 6, 11. The casters 6 are welded to the base parallel to angle iron 7, 9. The casters 11 are also welded to the base but are able to swivel or rotate 360 degrees in any direction.

FIG. 1A also shows a handle 1, an elongated pipe 3, a transverse pipe 4, and a lifting pipe 5. FIG. 1B better shows these components without the base obstructing its view. The handle assembly may be viewed without the base in plan view FIG. 1C. The handle is constructed of steel pipe or tube. I presently prefer the pipe to be 1 inch in diameter and $1/16^{th}$ inches thick. Pipe 1 is 10 inches long, pipe 3 is 44 inches long, pipe 4 is 25 inches long, and pipe 5 is 6 inches long. A gusset or steel plate 2 is welded to the inside joint of pipes 1 and 3. The gusset has a length of 2.5 inches, a width of 1.5 inches, and a thickness of 0.25 inches. FIG. 1B shows a tab 16 welded to pipe 3. The tab 16 is attached perpendicular to transverse pipe 4. The tab 16 is made of steel and is $1/8^{th}$ inch thick. A hole measuring 3/8 inches in diameter is drilled through the tab 16.

The cross pipe 4 is located between the front caster 10 and the rear casters 11 to provide more control when moving or steering the barrel caddie. This location of the steering and moving handle reduces the possibility that the barrel will be tipped over because is exist in a location closer to the middle of the barrel. Prototypes have been made where the handle passed under the middle of the barrel, but the ability to steer the barrel was reduced.

Figure 2:
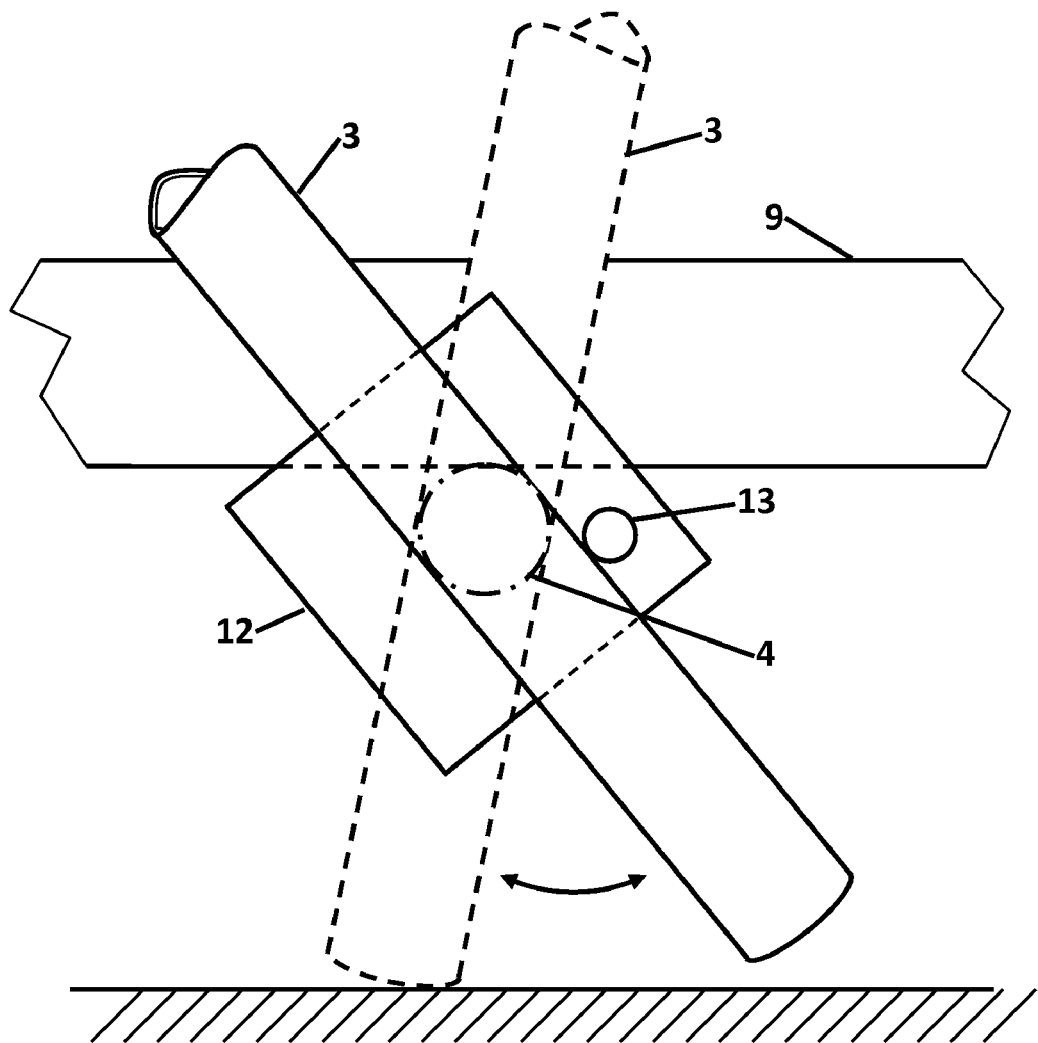
FIG. 2 is a view showing the hinge mechanism and attachment point between base and handle assembly

FIG. 2 shows an enlarged plan view of a hinge assembly that connects elongated pipe 3 to the base. Pipe 3 pivots under angle iron 9 at location 4. A plate or square of metal 12 measuring 3 inches by 3 inches by $3/8^{th}$ inch is welded to angle iron 9. A 1 inch diameter hole is drilled in plate 12 so that the center of the hole is 1.5 inches from the bottom tip of the plate 12. A bumper 13 is welded to plate 12. The bumper 13 is made of the same 1 inch diameter pipe as the elongated handle 3. The bumper is about 1.5 inches long and prevents over rotation of the elongated pipe 3 to prevent the pipe from rotating to the ground.

Figure 3:
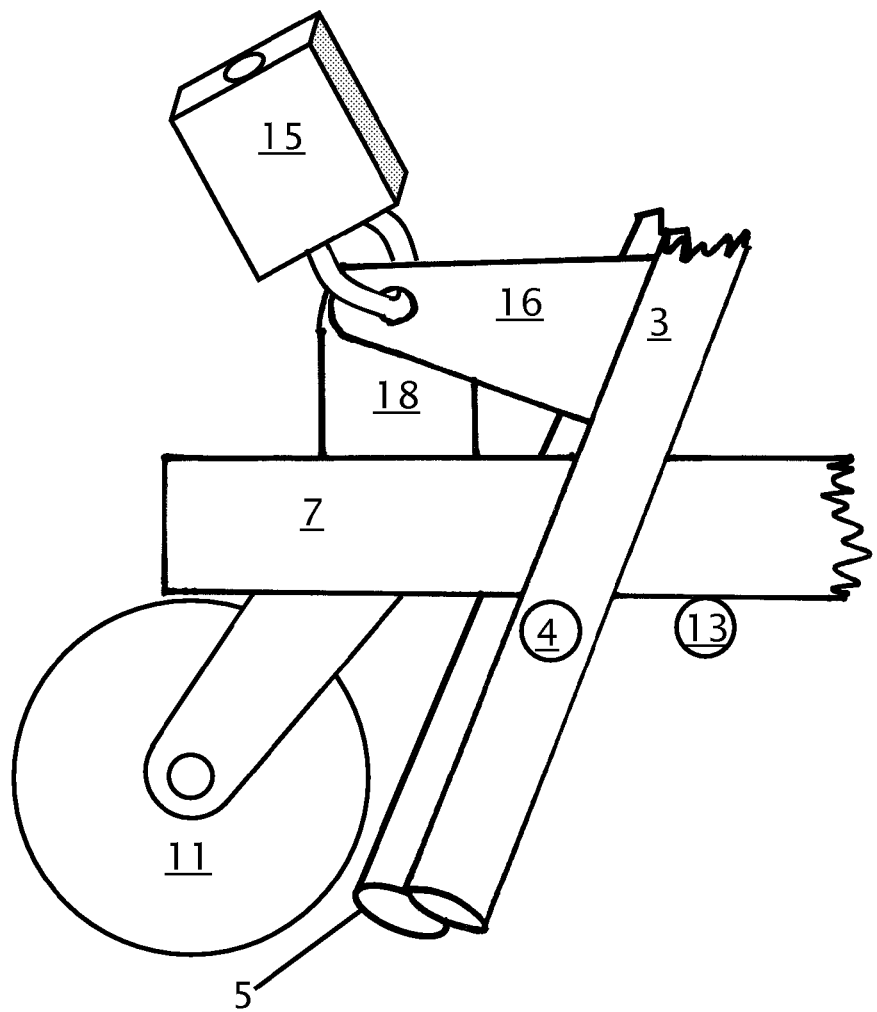
FIG. 3 is a view (180 degrees opposite of FIG. 2) of the hinge mechanism/lifting pipe on the opposite side of the elongated handle.

FIG. 3 is an enlarged plan view of transverse pipe 4, lifting pipe 5, angle iron 7, plate 18, and swiveling caster 11. Plate 18 can be identical to plate 12 (shown in FIG. 2) but is shown here as a rounded wedge shape. Plate 18 is welded to angle iron 7. A one inch diameter hole is drilled in plate 18 so that the center of the hole is 1.5 inches from the bottom tip of the plate 18. The transverse pipe 4 is held in place by the two 1 inch holes in plate 18 and plate 12 (shown in FIG. 2). The lifting pipe 5 is welded to transverse pipe 4 at a 90 degree angle. Another $3/8^{th}$ inch hole is drilled in angle iron 9 using the hole in tab 16 (from FIG. 1B) as a guide. This ensures a flush path for the hasp for the shackle of padlock 15 to pass through.

Operation—FIG. 2 and FIG. 3

While the elongated handle 3 is in the over center position, the gusset 2 (from FIG. 7) extends over the top of the barrel. Locking the elongated pipe 3 in this position effectively prevents the barrel from being removed from the caddie. This position now provides the user with the advantages of the barrel being locked to the cart, and the cart's swivel casters 11 are elevated preventing the cart itself from being moved. This elevated orientation makes stealing or moving the barrel in this position is difficult.

FIG. 4 is a top view of the base 7, 8, 9, and 10 and handles assembly pipes 1, 3, 4, 5. The transverse pipe 4 is parallel to angle iron 10. The center point of transverse pipe 4 is mounted 7 inches from the outside edge of angle iron 10.

FIG. 5 and FIG. 6 are isometric views of the barrel caddie while carrying a barrel 14. Note the different positions of elongated pipe 3 between the two figures. In FIG. 5 the top of barrel can be opened and allows full access to the contents of the barrel. In FIG. 6 the handle is rotated over and locked into position over the top of the barrel. This prevents tampering and or access to the interior of the barrel.

Figure 7:
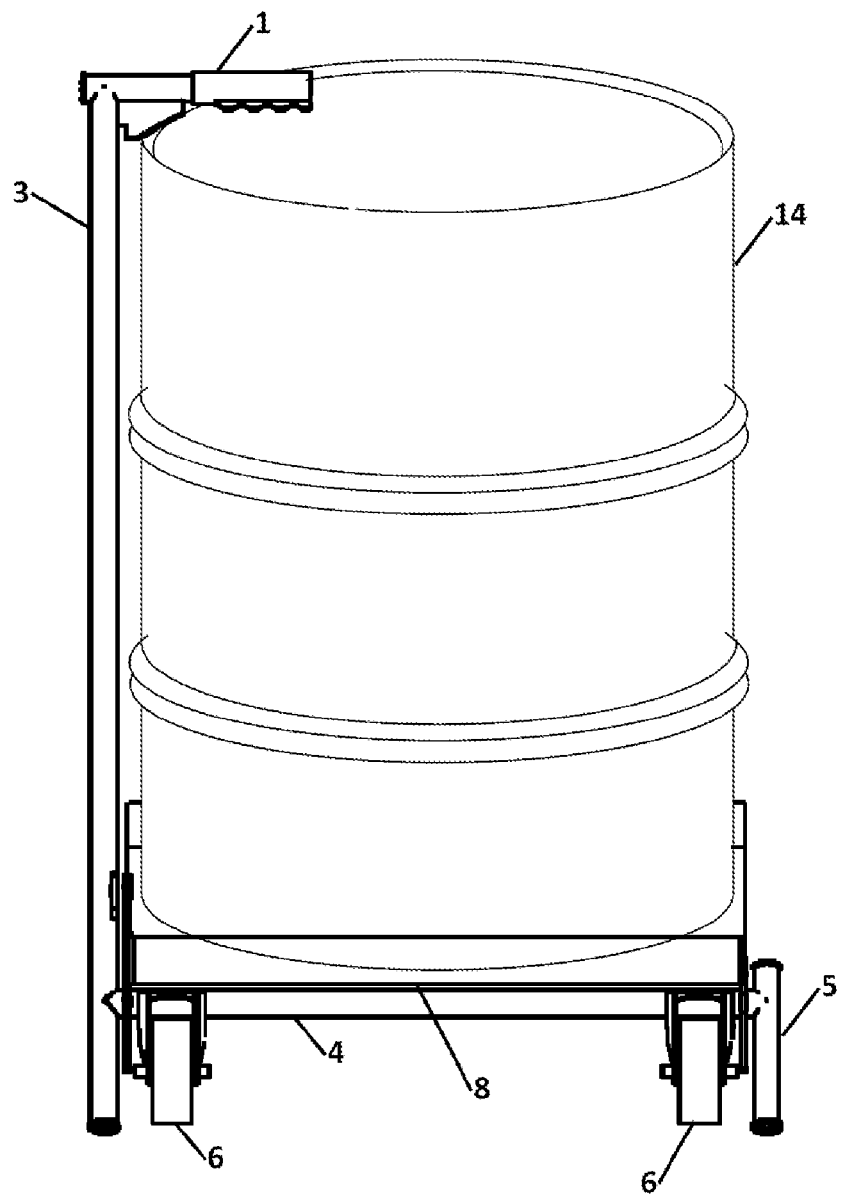
FIG. 7 is a rear isometric view of the base, handle assembly, and barrel.

FIG. 7 is an isometric view of the rear of the barrel caddie including handle 1, gusset 2, elongated pipe 3, transverse pipe 4, lifting pipe 5, fixed casters 6, rear angle iron 8, and barrel 14. Note that gusset 2 touches the top of the barrel.

Operation—FIGS. 5, 6, 7

The elongated handle 3 may be hinged or pivoted around the horizontal axis or transverse pipe 4. As in FIG. 5, when handle 1 is down or away from the barrel, the user can maneuver the barrel with ease. Since casters 6 are fixed and casters 11 are able to swivel the user has a great amount of leverage in turning the base to the left or right.

After the user can maneuvers the caddie to the desired location, he can raise the handle 1 so it pivots up and over the barrel as shown in FIG. 6. Doing so causes the elongated handle 3 and the lifting handle 5 (not shown) to extend below the bottom of casters 11 thereby raising them in the air. The caddie base is now supported by the two fixed casters 6, the elongated handle 3, and the lifting handle 5 (not shown). The elevated position of casters 11 effectively prevents the cart from rolling. Thus the brake mechanism avoids the possibility of unwanted cart movement.

Note that the elongated handle 3 when placed in the raised position travels past vertical or over center. This causes the elongated handle 3 to tend to stay over the center of transverse pipe 4 thereby keeping the swivel casters 11 elevated.

FIG. 7 demonstrates that the gusset 2 comes in contact with the top of the barrel. The purpose of the gusset is to provide a cushion of space between the handle 1 and the top of the barrel 14. This space cushion ensures that the user's knuckles will not be pinched while grabbing the handle 1.

Figure 8:
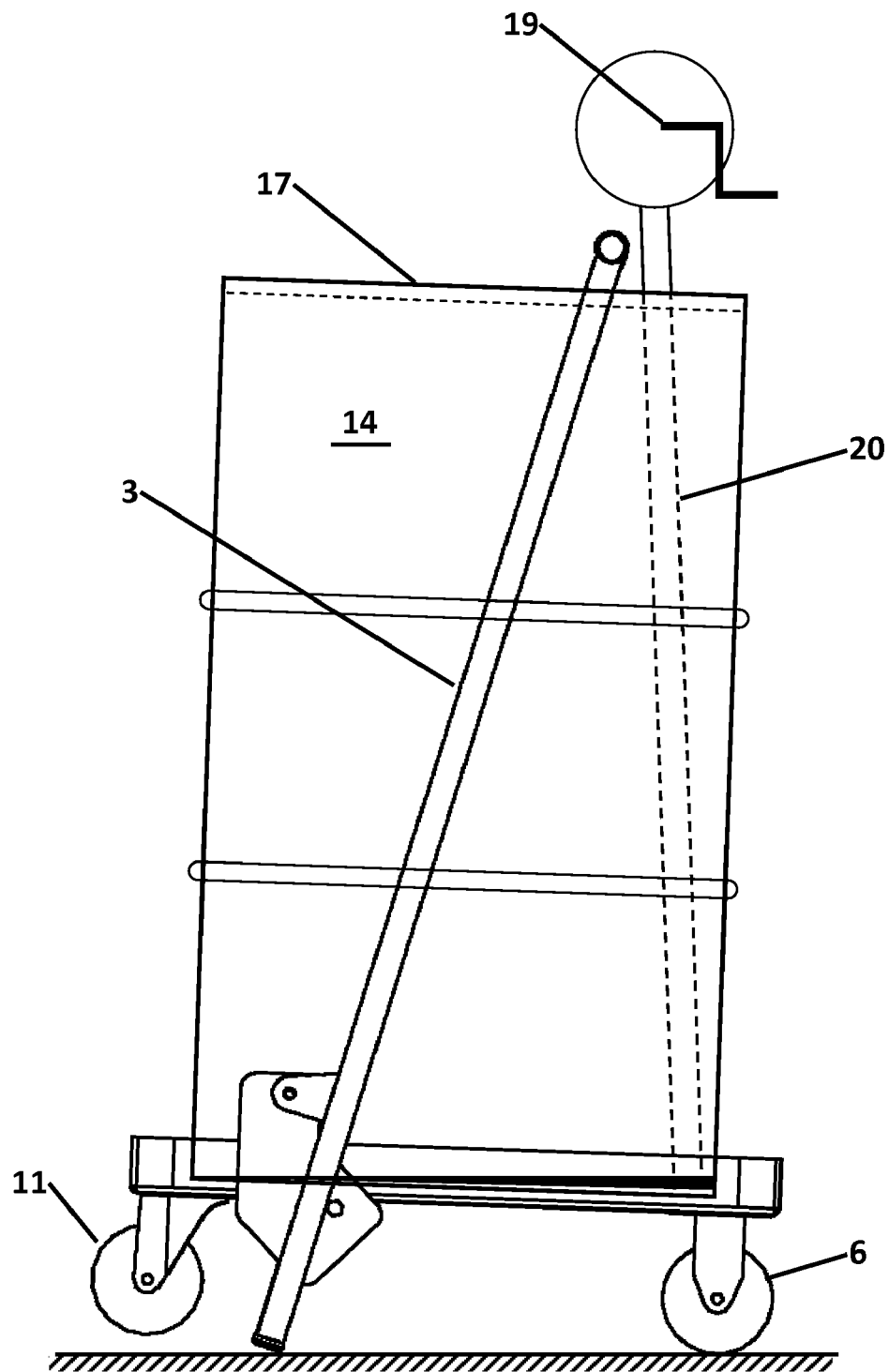
FIG. 8 is an isometric view of the shifted barrel contents when one side of the base is elevated.

Operation—FIG. 8

Barrels are mostly used to store liquids. Liquids are often extracted from the barrel using a hand cranked or electric pump. A hole is located in the lid 17 of the barrel so just a small opening is exposed to reduce evaporation and tampering. The pump 19 uses a suction device or hose 20 to extract the liquids. As the barrel is pumped dry, a thin layer of liquid is left in the bottom of the barrel 14. Tilting the barrel to the side of the suction device 20 is the most effective way to remove more of its contents.

The Barrel Caddie can easily tilt the barrel off center simply by raising the handle 1 over center. This movement is translated down the elongated pipe 3 where it lifts the swiveling casters 11 off the ground while still maintaining the fixed casters 6 in contact with the ground.

Thus, specific embodiments of a barrel cart have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A device for moving and storing a barrel comprising:
   a base;
   said base having at least four elevated outside edges for locating a base of a 55 gallon storage drum within said at least two elevated sides from said base;
   a plurality of casters;
   an elongated handle having a transverse grip and plate located in a joint of said grip and handle that extends beyond and over a height of said 55 gallon storage drum for engaging said drum, wherein a first end of said elongated handle is movable over a top of said 55 gallon storage drum to cover at least a portion of said top of said 55 gallon storage barrel, and is further lockable in its moved position to prevent full access to an interior of said 55 gallon storage barrel placed on said base;
   a second end of said elongated handle is movable to lift at least one side of said base to allow contents of said 55 gallon barrel placed on said base to collect on a bottom edge of said 55 gallon barrel whereby allowing for more complete draining of said contents of said 55 gallon barrel;

said first end of said elongated handle that provides for movement of pulling, pushing and steering of said base on said plurality of caster, and said elongated handle is rotated to engage said a second end of said elongated handle with the ground to effectively reduce free rolling of said device.

2. The device for moving and storing a barrel of claim 1 wherein placement of said elongated handle in some positions extends below the plane created by a bottom of said casters causing a plurality of casters to be elevated.

3. The device for moving and storing a barrel of claim 1 wherein said elongated handle is used to raise casters at one or more points of contact with the ground.

4. The device for moving and storing a barrel of claim 1 wherein said handle is pivotably mounted on a horizontal axis allowing said handle to move past vertical and over center thereby urging the handle to stay in place.

5. The device for moving and storing a barrel of claim 1 wherein the second end of the elongated handle is linked with a second member to provide a stable base.

* * * * *